United States Patent
Beasley et al.

(10) Patent No.: US 6,804,334 B1
(45) Date of Patent: Oct. 12, 2004

(54) METHOD AND DEVICE FOR DYNAMIC MESSAGE DELIVERY BASED UPON IDENTIFICATION OF ORIGINATING CALLER

(75) Inventors: John Richard Beasley, Cary, NC (US); Rebecca Lee Bessette, Erie, CO (US); Wilbur Lee Bright, Raleigh, NC (US); Gerald P. Carney, Cary, NC (US); Jeffrey Thomas Cortley, Westfield, NJ (US); Michael M. Cruzcosa, Austin, TX (US); James J. Daniels, Raleigh, NC (US); David J. Ford, Apex, NC (US); Charles David Morgan, Cary, NC (US); Kasiraman Narayanaswamy, Cary, NC (US); Marcellus Alvernon Pannell, Durham, NC (US); John A. O'Reilly, Raleigh, NC (US); Mark A. Weissman, Carrboro, NC (US); Weizhong Zhang, Cary, NC (US)

(73) Assignee: Lucent Technologies Inc., Murray Hill, NJ (US)

(*) Notice: Subject to any disclaimer, the term of this patent is extended or adjusted under 35 U.S.C. 154(b) by 0 days.

(21) Appl. No.: 09/574,383

(22) Filed: May 19, 2000

(51) Int. Cl.⁷ .............................................. H04M 1/64
(52) U.S. Cl. .............................. 379/88.17; 379/88.19; 379/88.22
(58) Field of Search .................... 379/67.1, 70, 76, 379/88.11, 88.12, 88.17, 88.19, 88.2, 88.21, 88.22, 90.01, 93.01, 93.17, 142.01, 142.06, 142.08

(56) References Cited

U.S. PATENT DOCUMENTS

| | | | |
|---|---|---|---|
| 5,692,038 A | 11/1997 | Kraus et al. | 379/210 |
| 5,717,741 A | 2/1998 | Yue et al. | 379/67 |
| 5,748,709 A | 5/1998 | Sheerin | 379/67 |
| 5,892,814 A * | 4/1999 | Brisebois et al. | 379/88.24 |
| 6,067,348 A * | 5/2000 | Hibbeler | 379/88.16 |
| 6,359,970 B1 * | 3/2002 | Burgess | 379/67.1 |

FOREIGN PATENT DOCUMENTS

| | | | | |
|---|---|---|---|---|
| EP | 455912 A2 | * | 11/1991 | H04M/3/50 |
| EP | 957622 A2 | * | 11/1999 | H04M/3/50 |
| GB | 2318702 A | * | 4/1998 | H04M/1/65 |

* cited by examiner

Primary Examiner—Scott L. Weaver

(57) ABSTRACT

The invention comprises a method and device for dynamic message delivery based upon the identification of an originating caller. Specifically, the originating caller for an incoming call is identified and compared to a list of callers, where each caller within the list of callers is associated with one of a plurality of dispositions, the dispositions including accept, reject and forwarding of an incoming call. The incoming call is routed based upon the disposition associated with the identified originating caller. In the case of a subscriber utilizing a dial-up internet account, a message is sent to the subscriber via the internet connection alerting the subscriber that an incoming call is present and offering the subscriber various disposition options.

33 Claims, 9 Drawing Sheets

SWITCH-ADJUNCT ARCHITECTURE

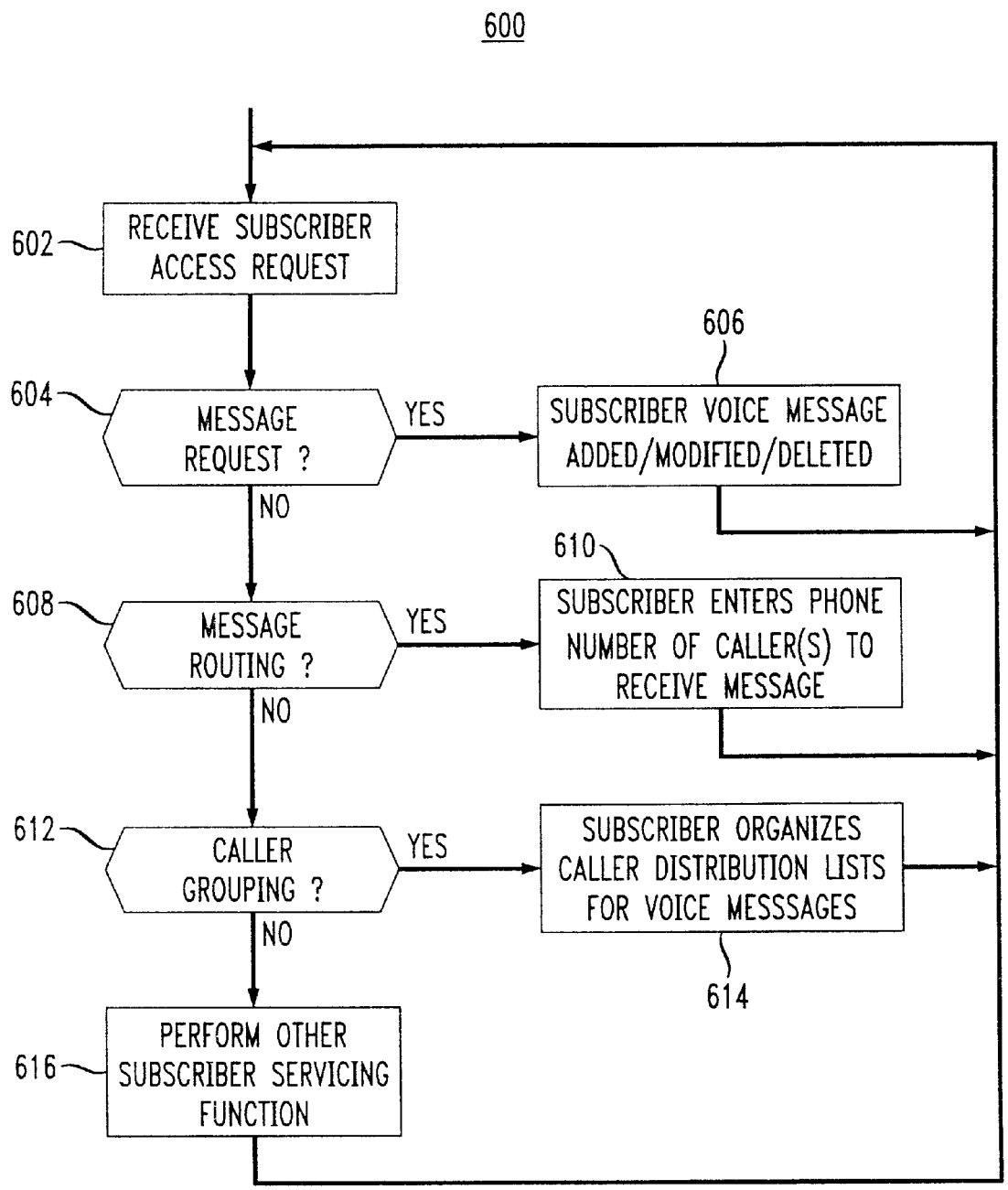

Caller Log Information

Caller Log Information         Lucent Technologies
                               Bell Labs Innovations

| Time/Date | Caller | Phone No | Status |
|---|---|---|---|
| Mon Oct 05 11:06:04 EDT 1998 | UNKNOWN | 312-523-9050 | Rejected |
| Mon Oct 05 11:11:38 EDT 1998 | UNKNOWN | 312-523-9050 | Accepted |
| Mon Oct 05 11:19:47 EDT 1998 | UNKNOWN | 312-523-9051 | Forwarded |
| Mon Oct 05 11:22:40 EDT 1998 | UNKNOWN | 312-523-9050 | Rejected |
| Mon Oct 19 10:56:14 EDT 1998 | idontcare | 919-380-4588 | Rejected |
| Mon Oct 05 11:06:04 EDT 1998 | UNKNOWN | 312-523-9050 | Rejected |
| Mon Oct 05 11:11:38 EDT 1998 | UNKNOWN | 312-523-9050 | Accepted |
| Mon Oct 05 11:19:47 EDT 1998 | UNKNOWN | 312-523-9051 | Forwarded |
| Mon Oct 05 11:22:40 EDT 1998 | UNKNOWN | 312-523-9050 | Accepted |
| Mon Oct 19 10:56:14 EDT 1998 | idontcare | 919-380-4588 | Rejected |
| Mon Oct 05 11:06:04 EDT 1998 | UNKNOWN | 312-523-9050 | Accepted |
| Mon Oct 05 11:11:38 EDT 1998 | UNKNOWN | 312-523-9050 | Rejected |
| Mon Oct 05 11:19:47 EDT 1998 | UNKNOWN | 312-523-9051 | Forwarded |
| Mon Oct 05 11:22:40 EDT 1998 | UNKNOWN | 312-523-9050 | Accepted |
| Mon Oct 19 10:56:14 EDT 1998 | idontcare | 919-380-4588 | Accepted |
| Mon Oct 05 11:06:04 EDT 1998 | UNKNOWN | 312-523-9050 | Accepted |
| Mon Oct 05 11:11:38 EDT 1998 | UNKNOWN | 312-523-9050 | Forwarded |
| Mon Oct 05 11:06:04 EDT 1998 | UNKNOWN | 312-523-9050 | Accepted |
| Mon Oct 05 11:11:38 EDT 1998 | UNKNOWN | 312-523-9050 | Rejected |

[ To Audo Disp. ] [ Delete ] [ Apply ] [ Close ]

METHOD AND DEVICE FOR DYNAMIC MESSAGE DELIVERY BASED UPON IDENTIFICATION OF ORIGINATING CALLER

BACKGROUND OF THE INVENTION

1. Technical Field of the Invention

This invention relates to communication systems generally and, more particularly, to a server-centric method and device for routing incoming calls and delivering messages based upon the identification of the originating caller.

2. Background Art

Present network-based voicemail and messaging services allow subscribers to record different messages which are stored in the network and delivered to incoming callers if the subscriber's telephone line is busy or if the subscriber fails to answer the telephone within a pre-defined time period. Telephone answering devices that utilize identification of incoming callers to provide caller-specific message playback or recording are known. For example, U.S. Pat. No. 5,748,709 discloses a programmable answering machine with multiple voicemail boxes that utilizes caller ID to automatically route incoming messages to respective individual voicemail boxes and to provide individualized greetings to callers. Unfortunately, when the user of such an answering machine is using a telephone, the answering machine is unavailable to receive or route messages. Moreover, a subscriber having only a single phone line may utilize that single line for extended time periods to connect to the internet via a "dial-up" internet service provider (ISP), as well as standard telephony services. As such, a subscriber using such an answering machine loses all messaging capability during telephony or data access use of the subscriber's line.

Therefore, it is seen to be desirable to provide a method and device for delivering individualized messages based upon the identification of an originating caller within an intelligent telecommunications network. Moreover, it is seen to be desirable to provide such message delivery regardless of whether the subscriber's line is busy. Finally, in the case of a subscriber utilizing a single line for internet access, it is seen to be desirable to provide a method and device for alerting such user to the presence of an incoming telephone call and providing such user with the option of accepting that call or otherwise disposing of the call.

SUMMARY OF THE INVENTION

The invention comprises a method and device for dynamic message delivery based upon the identification of an originating caller. Specifically, in the method according to the present invention, the originating caller for an incoming call is identified and compared to a list of callers, where each caller within the list of callers is associated with one of a plurality of dispositions, the dispositions including accept, reject and forwarding of an incoming call. The incoming call is routed based upon the disposition associated with the identified originating caller. In the case of a subscriber utilizing a dial-up internet account, a message is sent to the subscriber via the internet connection alerting the subscriber that an incoming call is present and offering the subscriber disposition options.

BRIEF DESCRIPTION OF THE DRAWINGS

The teachings of the present invention can be readily understood by considering the following detailed description in conjunction with the accompanying drawing, in which:

FIG. 6 depicts a subscriber servicing method according to the present invention; and FIGS. 7–9 depict exemplary subscriber display screens useful in understanding aspects the present invention.

To facilitate understanding, identical reference numerals have been used, where possible, to designate identical elements that are common to the figures.

DETAILED DESCRIPTION OF THE INVENTION

The invention will be primarily described within the context of a compact server node (CSN) utilized in the public switch telephone network to provide a customer announcement service functionality that is remote from each subscriber utilizing the service. However, it will be appreciated by those skilled in the art that the teachings in the present invention may be readily adapted to other voice networks or integrated voice and data networks, such as PBX systems and the like.

Figure 1:
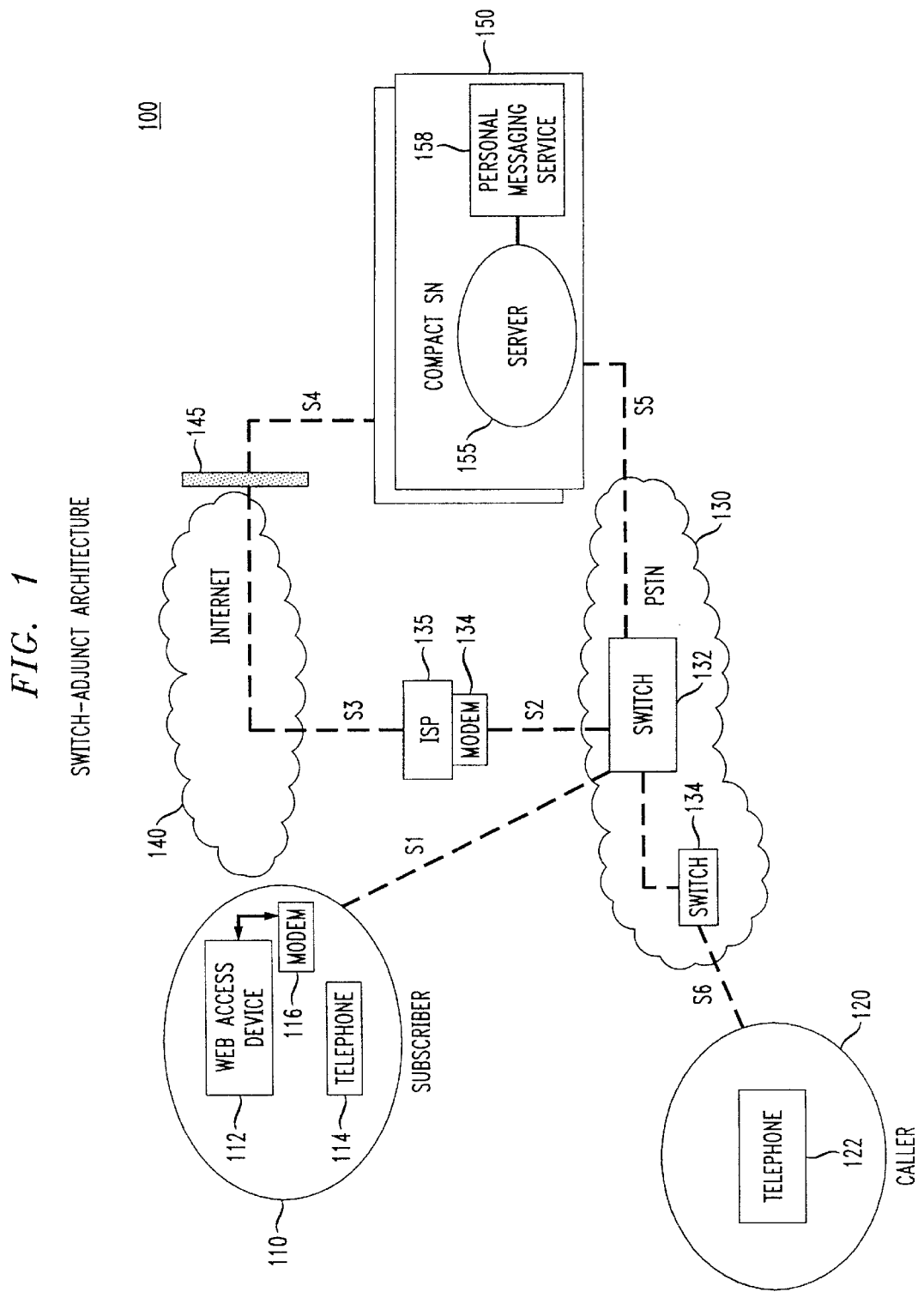
FIG. 1 depicts a high level block diagram of a system including the present invention.

FIG. 1 depicts a high level block diagram of a communications system including the present invention. Specifically, FIG. 1 depicts a high level block diagram of a communications system 100 including communications and networking capability suitable for implementing the present invention.

The communications system 100 of FIG. 1 comprises subscriber equipment 110 including a network or internet (i.e., world wide web or "web") access device 112 and a telephone 114. The subscriber equipment 110 communicates with a first switch 132 within the Public Switched Telephone Network (PSTN) 130. It is noted that the subscriber equipment 110 communicates with the first switch 132 using a single telephone line, illustratively a POTS line. However, the teachings of the present invention are also applicable to a caller utilizing a plurality of POTS lines, a digital subscriber line (DSL) or any other communication path.

The communications system 100 of FIG. 1 also comprises caller equipment 120, including a respective caller telephone 122 that communicates with the first switch 132 either directly or, as depicted in FIG. 1, via a second switch 134 within the PSTN 130.

The first switch 132 communicates with an Internet Service Provider (ISP) 135, or other network service provider (NSP) via a modem 134. The ISP 135 is connected to the internet 140 and provides a "dial up" internet connection to the subscriber 110. It should be noted that while a least cost communication path between the ISP/NSP 135 and the subscriber 110 is likely a path utilizing only a single switch (as depicted in FIG. 1), this is not strictly necessary to the practice of the invention.

The subscriber 110 uses the telephone 114 in a standard manner to access the PSTN 130 via the first switch 132 for voice communication and other purposes. That is, the telephone 114 is used to transmit and receive voice traffic to and from other telephones, such as the telephone 122 of the caller 120.

The first switch 132 is also coupled to a compact server node (CSN) 150 including a server 155 implementing a customer announcement service 158. The customer announcement service 158 provides caller-specific messaging, forwarding and other services as will be described in more detail below with respect to FIGS. 2 through 9. Briefly, the personal message service allows a subscriber to provide individual greetings and/or messages to callers based on, for example, the telephone number of the caller (i.e., the caller identification). The subscriber may set up group lists where each member of the group receives a common message.

The CSN 150 is also connected to the internet 140 via a firewall 145. The CSN 150 cooperates with the ISP/NSP 135 to send messages to a subscriber during an active internet or network session. That is, the CSN 150 transmits messages to the ISP/NSP 135 indicative of, for example, the name and number of a calling party that is trying to reach the subscriber having a busy subscriber line (due to the internet session). Additionally, in the case of a subscriber 110 accessing the internet where the subscriber has only one telephone line connecting to the switch 132, the customer announcement service 158 may be used to alert, the subscriber (via, for example, a pop-up display screen on the subscriber's web access device 112) that a incoming telephone call has arrived. The subscriber may then elect (via the web access device 112) to route the incoming telephone call to voicemail, to ignore the incoming telephone call or to accept the incoming telephone call. Other embodiments will also be described.

The ISP 135, in response to the message from the CSN 150, responsively provides the message information to the subscriber via, for example, a "pop up" dialog box or other messaging technique. For example, the ISP/NSP 135 utilizes the network access device 112 to alert the subscriber to an incoming call and the identity of the calling party. An exemplary subscriber alert dialog box is described below with respect to FIG. 9. Briefly, the alert is provided to the subscriber in a timely manner with respect to the incoming call such that the subscriber, may accept the call via the existing internet/network connection (using voice over internet protocol or other techniques). Alternatively, the subscriber may accept the call by terminating the network session and waiting for the incoming call to be routed to the subscriber's telephone 114.

Figure 2:
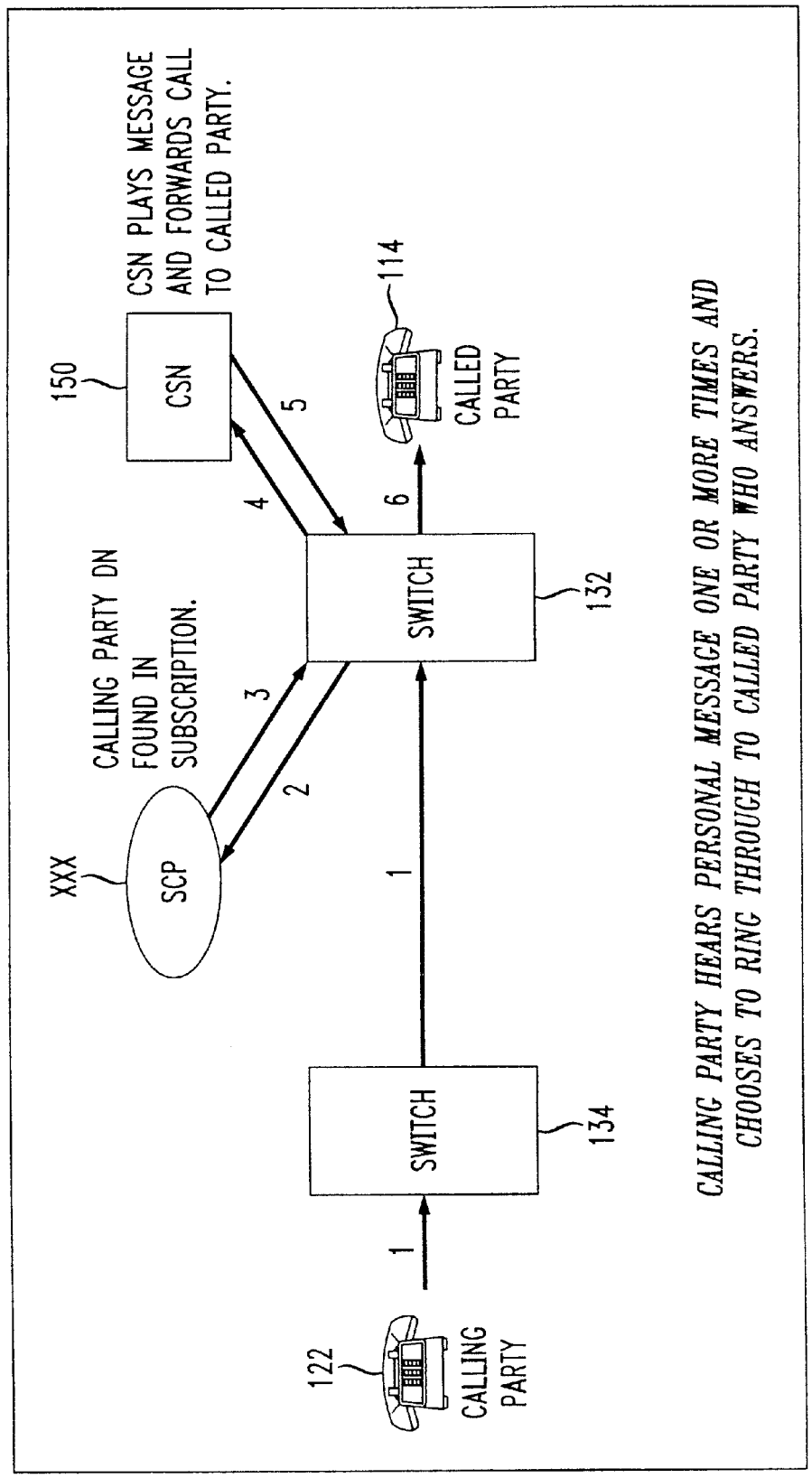
FIG. 2 depicts an interaction diagram useful in understanding the present invention.

FIG. 2 depicts an interaction diagram useful in understanding the present invention. Specifically, FIG. 2 depicts an interaction diagram illustrating interactions between various entities forming a system that utilizes the present invention. The system utilized in FIG. 2 comprises, illustratively, the system described above with respect to FIG. 1.

Personal Messaging Service

As previously mentioned, the CSN 150 implements a personal messaging service 158. The personal messaging service allows a subscriber to provide personal messages to select callers. These select callers can be given the personalized information that the subscriber wishes to convey without the subscriber's phone even ringing. The subscriber can record a personal message in his/her own voice and designate the caller(s) that should hear this message. Several callers may need to hear the same message. For example, a coach could set up a message specifying the time and place for practice, and he could also have a list of the telephone numbers of the team members already established. Each of the team members could then call in and receive this information without the coach having to speak to each one.

The purpose of the Personal Message Service is to give a subscriber the flexibility to communicate information to specific callers without having to answer the call personally. It gives the subscriber more control over incoming calls.

When the Personal Message Service is associated with a subscriber's telephone line, all incoming calls to the subscriber are screened to determine if the calling party has been designated by the subscriber to receive a personal message. If the caller has been selected to receive a personal message, then the network plays this message for the caller and then gives the caller the option to hear the message again, ring through to the subscriber, or end the call. If the caller has not been selected to receive a personal message, then the call completes to the subscriber as if the Personal Message Service were not there.

It should be noted that incoming calls designated to receive a personal message are not presented to the subscriber, unless the calling party chooses to ring through to the subscriber after hearing the message.

The subscriber to the Personal Message Service is the called party. In order to use the service, the subscriber records a personal message in his/her own voice. The subscriber must then designate the telephone number(s) of the caller(s) that should hear this message. For some messages only a single caller is intended to receive the message; however, sometimes a single caller must be specified by several different telephone numbers (e.g., home number, work number, cell phone number, etc.). At other times several people need to receive the same message, such as the members of a team or a committee. For these types of messages, a distribution list can be created that includes the telephone numbers of all of the team members. This list is created once, saved, updated as necessary and used repeatedly with new messages.

A calling party will only be able to receive the personal message on a single call. During this single call, though, the caller can request to hear the message multiple times. However, once that call is completed, the network has marked this calling party number as having heard the message; thus, any subsequent calls from this calling party number will complete to the subscriber as if the Personal Message Service were not there.

A personal message is information recorded in the subscriber's voice, and it is played to those callers specified by the subscriber. This is information that is provided to the caller in lieu of ringing the subscriber's phone and speaking with the subscriber personally.

The calling party number is the (illustratively) 10-digit telephone number of the person who is calling. The distribution list is made up of calling party numbers, and calling party numbers are associated with the personal messages.

A distribution list specifies several 10-digit calling party numbers that should be treated collectively (i.e., hear the same personal message).

The Dual Tone Multi Frequency (DTMF) interface is one method available to subscribers for inputting and/or modifying subscription data. The DTMF method comprises the transfer of a series of prompt and collect messages between the CSN 150 and the subscriber whereby the subscriber is prompted to enter the various elements of subscription data necessary for provisioning the service. The DTMF administrative interface will be described in more detail below. A second method for subscriber interaction with the CSN 150 is via the subscriber's ISP/NSP 135. In this method, the ISP/NSP 135 interacts with the subscriber in a standard manner to update subscriber data.

The system in FIG. 2 comprises a calling party telephone 122, a PSTN switch 134 associated with the calling party telephone 122, a PSTN switch 132 associated with a called party (i.e., the subscriber) 114, a service control point (SCP) and a compact service node (CSN) 150.

At step 1, the calling party 122 places a call to the called party 114. The request for a connection between the calling party 122 and the called party 114 is propagated through the switch 134 associated with the calling party 122 to the switch 132 associated with the calling party 114. At step 2, the switch 132 routes the incoming call to the SCP xxx, where the calling party's telephone number is determined. At step 3, the incoming call is routed back to the switch 132. At step 4, the incoming call is routed to the CSN 150. In the case of a calling party having a caller identification that is found within the subscription list, the CSN plays a message associated with that calling number to the calling party 122. Alternatively, at step 5, the CSN forwards the incoming call to the switch associated with the called party, which forwards the incoming call to the called party at step 6.

Figure 3:
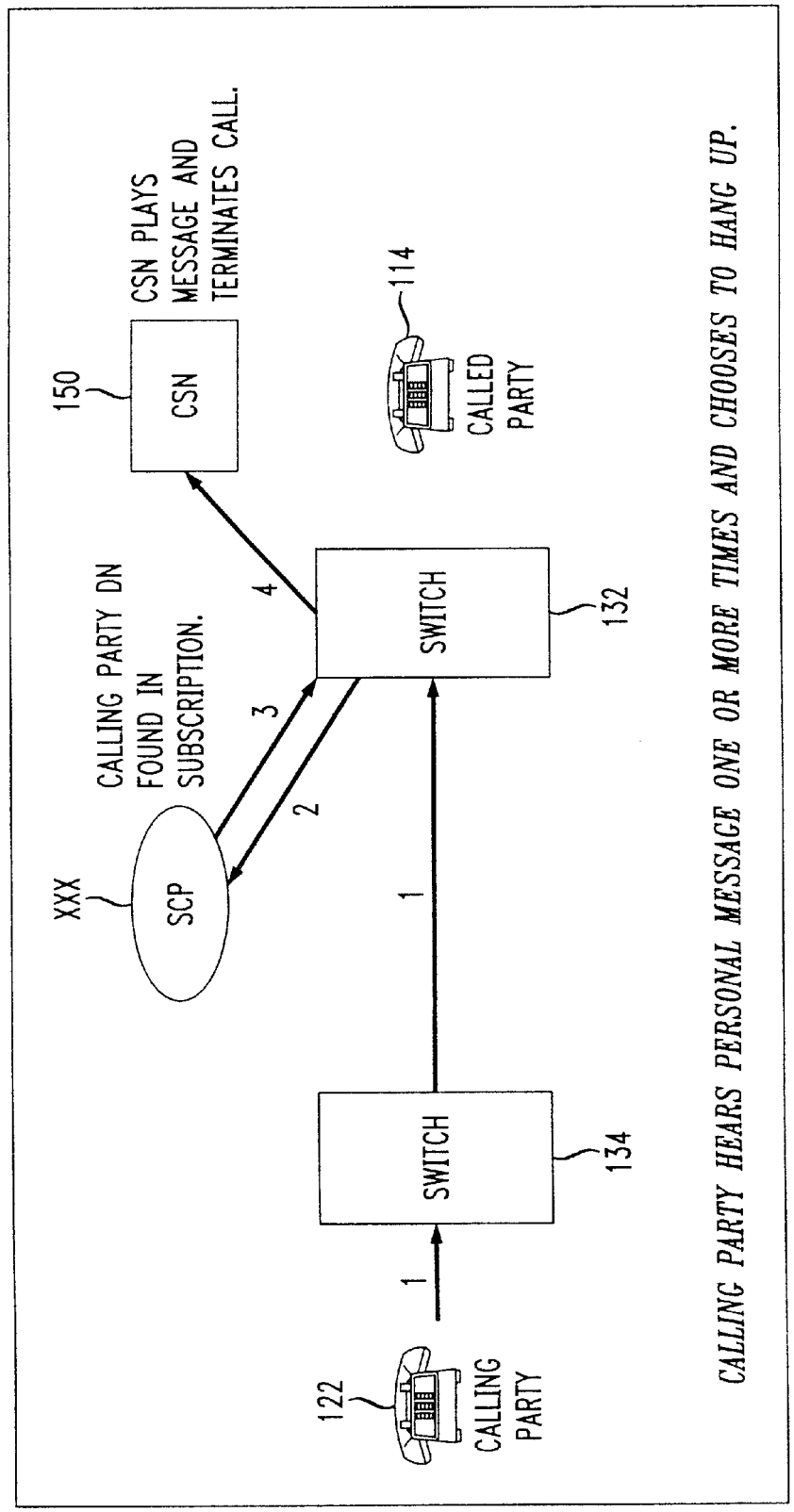
FIG. 3 depicts an interaction diagram useful in understanding the present invention.

FIG. 3 depicts an interaction diagram useful in understanding the present invention. Specifically, FIG. 3 depicts an interaction diagram that is substantially similar to the interaction diagram 200 of FIG. 2, except that in the interaction diagram 300 of FIG. 3, the calling party is not forwarded to the called party. That is, the interaction diagram 300 of FIG. 3 does not include steps 5 and 6. In the interaction diagram 300 of FIG. 3, the compact service node simply plays a message to the calling party and then terminates the call. The message played to the calling party is a message specifically intended for that calling party or for a group including that calling party.

Figure 4:
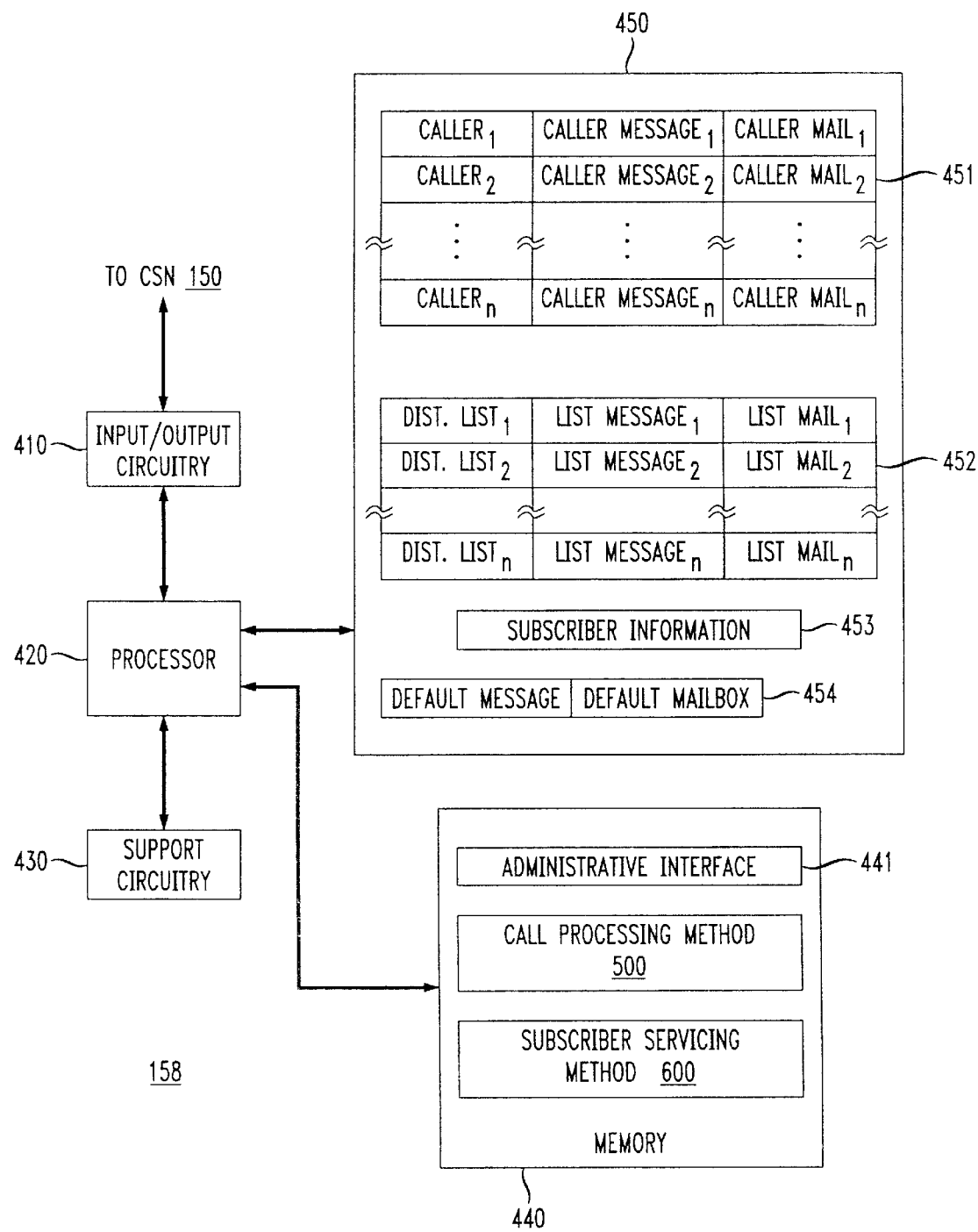
FIG. 4 depicts high level block diagram of a functional implementation of a personal messaging service suitable for use in the communications system of FIG. 1.

FIG. 4 depicts a high level block diagram depicting a functional implementation of a personal messaging service suitable for use in the communications system of FIG. 1. Specifically, FIG. 4 depicts a high level block diagram of a functional implementation of the personal messaging service 158 within the CSN 150 of the communications system 100 of FIG. 1. The personal messaging service 158 will be described within the context of a dedicated general purpose computer implementing the personal messaging service function. However, it will be appreciated by those skilled in the art that the processing and support functionality of the personal messaging service 158 may be implemented directly within the CSN 150 by hardware, software, or a combination of hardware software performing the personal messaging service function 158 in conjunction with all the other functions performed within the CSN 150.

The personal messaging service function 158 is implemented using a processor 420 as well as memory 440 for storing an administrative interface 441 (such as the above-described DTMF administrative interface), a call processing method 500 (such as described below with respect to FIG. 5) and a subscriber servicing method 600. The processor 420 cooperates with conventional support circuitry 430 such as power supplies, clock circuits, cache memory and the like as well as circuits that assist in executing the software methods. The processor 420also cooperate within input/output (I/0) circuitry 410 to form an interface between the personal messaging service function 158 and other functions (not shown) within the CSN 150. The processor 420 also cooperates with a data base 450 including a caller message and voice mail data base 451, a distribution list message and mail data base 452 and subscriber information 453.

The caller message and voice mail data base 451 is depicted as a tabular arrangement of data where each of a plurality of callers ($Caller_1$ through $Caller_n$) is associated with a respective caller message ($Caller\ Message_1$ through $Caller\ Message_n$) and a respective voice mail box ($Caller\ Mail_1$ through $Caller\ Mail_n$). Each of the callers ($Caller_1$ through $Caller_n$) may be identified by the telephone number associated with that caller, as well as the name of the caller. Each of the caller messages ($Caller\ Message_1$ through $Caller\ Message_n$) comprises a unique voice message provided by the subscriber and played for the corresponding caller in the case of the subscriber not answering an incoming call from that corresponding caller. Each of the caller mail boxes ($caller\ mail_1$ through $caller\ mail_n$) comprises a unique voice mail box for each corresponding caller in which the corresponding caller may leave a message.

It should be noted that the data base 450 also includes a default message and default mail box 454. The default message is provided to callers that are not included within the caller data base 451 or are not members of any of the distribution lists within the distribution list data base 452. The default mail box is also used by such callers. Alternatively, the subscriber information 453 may include an indication that all messages recorded by callers are to be placed within the default mail box.

The subscriber information data base 453 includes all the information associated with a particular subscriber that is necessary to implement the present invention. For example, the subscriber information data base may include the name and address of the ISP/NSP 135 used to service the subscriber, the address of the network access device 112 used by the subscriber, general billing information associated with the subscriber, and other information that will be appreciated by those skilled in the art and informed by the teachings of the present invention.

The distribution list data base 452 includes a tabular representation of a plurality of distribution lists ($Distribution\ List_1$ through $Distribution\ List_n$), where each distribution list includes a plurality of members that are identified via their respective telephone numbers and/or names. Each distribution list is associated with a corresponding list message that is played to any calling party that is a member of the list. Each distribution list is also associated with a corresponding mail box, that is used to store messages provided by any member of the list.

The administrative interface 441 will now be described in more detail. The call processing method 500 will be described below with respect to FIG. 5. The subscriber servicing method 600 will be described below with respect to FIG. 6.

DTMF Administrative Interface

The following is an exemplary administrative interface for use with the personal messaging service 158 of the CSN 150. The administrative interface may be accessed by a subscriber via the subscriber's telephone utilizing the known dual tone multiple frequency (DTMF) technique. Alternatively, the subscriber may perform administrative functions via the ISP/NSP 135. The below administrative interface assumes the use of a DTMF interface by the subscriber. The numbers indicated numeric entries made by a subscriber on the subscriber's telephone to navigate the various menus.

Figure 5:
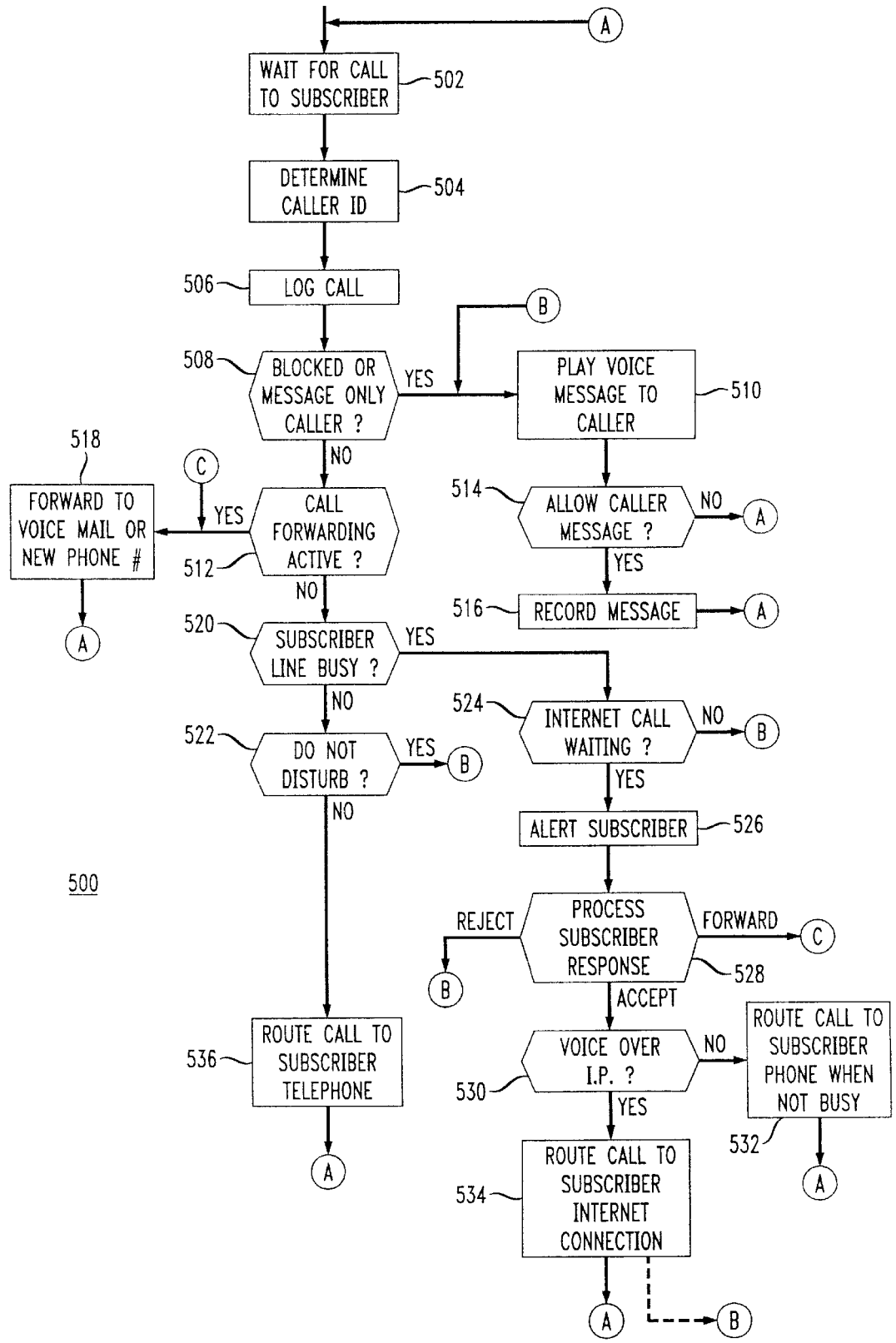
FIG. 5 depicts a flow diagram of a method for routing an incoming call according to an embodiment of the invention.

Main Menu:
1: Listen to personal messages:
    Listen to all messages in succession 2: Delete or modify existing personal messages:
   Identify a message by entering 10 digit telephone number (e.g., a caller identification) or a 2 digit distribution list number associated with the message;
   Listen to message
   1: delete the message
   2: modify/rerecord the message
3: Record new personal messages:
   Record a message;
   Enter list of 10 digit telephone numbers of people to hear message or enter a 2 digit distribution list to hear the message;
   verify that message not already associated with any of telephone numbers for new message
4: Setup and administer distribution lists:
   1: setup a new distribution list
   assign distribution list number; record distribution list title; enter list of 10 digit telephone numbers, verifying each one
   2: access established distribution lists
      1: replay established distribution list information
         1: replay the titles of established distribution lists
         2: replay the telephone numbers on an established distribution list
      2: delete an established distribution list
         enter distribution list number, verify entry, delete
      3: modify an established distribution list
         select distribution list to modify
            1: add a telephone number to an established distribution list
            Enter a list of 10 digit telephone numbers, verifying each one
            2: delete a telephone number from an established distribution list
               1: know the telephone number to delete
               Enter number and verify
               2: hear all numbers on list one at a time
                  After hearing each entry delete or continue with list
            3: record the title of an established distribution list
5: Change password:
9: End call FIG. 5 depicts a flow diagram of a method for routing an incoming call according to an embodiment of the invention. Specifically, the method 500 of FIG. 5 implements some of the functionality provided by the customer announcement service 158 of the compact switching node 150.

The method 500 is entered at step 502, where it waits for a call to the subscriber to be made. Upon receiving an incoming call, the method 500 proceeds to step 504 where the identification (e.g., the caller ID) of the calling party is determined, and to step 506 where the incoming call is logged. The method 500 then proceeds to step 508.

At step 508, a query is made as to whether the identified caller is a blocked or message only caller. That is, whether the identified caller is on a list of callers that are either never forwarded to the subscriber's telephone (e.g., known solicitors, ex-spouses and the like). If the query at step 508 is answered negatively, then the method 500 proceeds to step 512. If the query at step 508 is answered affirmatively, then the method 500 proceeds to step 510.

At step 510, a voice message is played to the calling party. The voice message may be a general voice message or a voice message specifically directed to the calling party. The method 500 then proceeds to step 514 where a determination is made as to whether the calling party is allowed to leave a message. If the calling party is not allowed to leave a message, then the incoming call is terminated and the method 500 proceeds to step 502, where it waits for the next call to the subscriber. If a calling party is allowed to leave a message, then the message, if any, is recorded at step 516, and the method 500 proceeds to step 502.

At step 512, a query is made as to whether call forwarding is active. If the query at step 512 is answered affirmatively, then the method 500 proceeds to step 518, where the calling party is forwarded to either voicemail or a new phone number. In one embodiment of the invention, if the calling party is identified as being a member of a call forward list, then the incoming call is routed to the new phone number. Otherwise, the incoming call is routed to voicemail. The method 500 then proceeds to step 502.

If the query at step 512 is answered negatively, then the method 500 proceeds to step 520. At step 520, a query is made as to whether the subscriber's line is busy. If the subscriber's line is busy, then the method 500 proceeds to step 524. If the subscriber's line is not busy, then the method 500 proceeds to step 522.

At step 522, a query is made as to whether the subscriber has activated a "do not disturb" feature indicating a desire not to receive incoming phone calls. If the do not disturb feature has been activated, then the method 500 proceeds to step 510. If the do not disturb feature has not been activated, then the method 500 proceeds to step 536 where the call is routed to the subscriber's telephone in the standard manner. The method 500 then proceeds to step 502 to wait for the next call to the subscriber.

At step 524, a query is made as to whether a internet call waiting feature has been enabled. If the internet call waiting feature has not been enabled, then the method 500 proceeds to step 510. Otherwise the method 500 proceeds to step 526, where the subscriber is alerted to the incoming call. That is, the internet call waiting feature examined at step 524 is enabled when a subscriber having a single telephone line utilizes his web access device 112 and the single telephone line to access the internet. Since the subscriber has only a single phone line, that phone line will necessarily be busy during this time. However, to avoid missed calls, the subscriber may activate the internet call waiting feature to receive a warning that an incoming call is present. At step 526, the subscriber is alerted to the presence of an incoming call via a pop-up window displayed on the subscriber's web access device 112.

To provide for the internet call waiting feature, the compact service node 150 transmits information via the fire wall 145 to the internet 140 and, subsequently, to the ISP 135 utilized by the subscriber. The ISP 135 responsively causes triggering information and caller identification information to be transmitted to the web access device 112 via signal paths S2 (to switch 132) and S1 (to the subscriber 110). The web access device 112, upon receiving the triggering information via the modem 116, responsively displays the pop-up window. In this manner, the typical "call waiting" signal normally associated with an incoming call to a busy subscriber line is avoided. Advantageously, the tendency of the call waiting signal to interfere with data communications between the modem 116 and ISP 135 is, therefore, also avoided.

After alerting the subscriber at step 526, the method 500 proceeds to step 528 where the subscriber's response is processed. That is, the pop-up menu or dialog box on the subscriber's web access device includes several buttons that may be selected by the subscriber. Those buttons comprise, for example, a "reject" response, a "forward" response and a "accept" response. When the subscriber selects one of the provider responses, that selection is propagated through signal paths S1 and S2 to the ISP 135, and through signal paths S3 and S4 to the CSN 150.

If the subscriber's response comprises a "forward" response, then the method 500 proceeds to step 518, where the incoming call is forwarded to voicemail or to a new phone number, depending upon the identification of the calling party. If the subscriber's response comprises a "reject" response, then the method 500 proceeds to step 510, where a voice message is played to the caller and, optionally, the caller is allowed to leave a message. If the subscriber's response comprises an "accept" response, then the method 500 proceeds to step 530, where a query is made as to whether a voice over internet protocol (IP) function is desired.

If the query at step 530 is answered affirmatively, and a voice over IP functionality is enabled between the subscriber's web access device 112 and telephone 114, then the call is routed to the subscriber's internet connection by the CSN 150. That is, the incoming call is routed from the calling party 120 via path S6 to the PSTN 130, and to the SCN 150 via signal path S5, and to the internet 140 via signal path S4, and to the ISP 135 via signal path S3, and to the subscriber's web access device 112 via signal paths S2 and S1. The method 500 then proceeds to step 502 to wait for the next incoming call. If a voice over IP functionality is not implemented or is not presently desired, the method 500 proceeds to step 532, where the call is routed to the subscriber's telephone 114 when the telephone line S1 is not busy. That is, the compact service node 150 begins querying the connection S1 between the subscriber 110 and the switch 132. When the connection is not busy, then the CSN 150 causes the incoming call to be routed to the subscriber's telephone 114. Optionally, the CSN 150 waits for a predetermined about of time (i.e., a time out duration) and, if a subscriber's line S1 remains busy beyond that time-out period, then the method proceeds to step 510 where a voice message is placed to the calling party and the calling party is optionally allowed to leave a message.

FIG. 6 depicts a subscriber servicing method according to the present invention. Specifically, the subscriber servicing method 600 of FIG. 6 is utilized by a subscriber that has communicated with the CSN 150 by the subscriber telephone to effect a change or addition to the customer announcement service 158 provided by the compact service node 150. The method 600 of FIG. 6 may be implemented using the above-described DTMF Administrative Interface.

The method 600 of FIG. 6 is entered at step 602, when the CSN 150 receives a subscriber access request. The method 600 then proceeds to step 604, where a query is made as to whether the subscriber access request is indicative of a message request. If the query at step 604 is answered negatively, then the method 600 proceeds to step 608. If the query at step 604 is answered affirmatively, then the method 600 proceeds to step 606 where one or more subscriber voice messages are added, modified or deleted. That is, at step 606, the subscriber navigates through a menu structure using, for example, the DTMF functionality of the subscriber's telephone 114. In this manner, the subscriber may add a new voice message, modify an existing voice message or delete an existing voice message. The method 600 then proceeds to step 602 where it waits for the next subscriber access request.

At step 608, a query is made as to whether the subscriber access request is indicative of a message routing request. If the query at step 608 is answered negatively, then the method 600 proceeds to step 612. If the query at step 608 is answered affirmatively, then the method 600 proceeds to step 610, where the subscriber enters the phone number of the caller or callers intended to receive a particular message. That is, at step 610, the subscriber interacts with the menu structure to associate the phone numbers of callers with voice messages. It will be noted that a single voice message may be associated with one or more callers, where a plurality of callers associated with a single voice message is known as a group of callers. The method 600 then proceeds to step 602 where it waits for the next subscriber access request.

At step 612, a query is made as to whether the subscriber access request is indicative of a caller grouping request. If the query at step 612 is answered affirmatively, then the method 600 proceeds to step 614. If the query at step 612 is answered negatively, then the method 600 proceeds to step 616.

At step 614, the subscriber interacts with a menu structure to organize caller distribution lists for voice messages. That is, the subscriber associates a plurality of caller telephone numbers with a single voice message to provide a caller distribution list. For example, in the case of a subscriber who is the coach of a little league baseball team, the caller distribution list may comprise all the phone numbers of the members of the little league, such that when any little league member calls the subscriber and a message will be played to that caller indicating any changes to the baseball schedule, any changes to the practice schedule and the like. The caller may optionally be given the choice of leaving a message or continuing with the call to directly contact the subscriber. The method 600 then proceeds to step 602 where it waits for the next subscriber access request.

At step 616, any other subscriber servicing function not addressed by steps 606, 610 and 614 is performed. After addressing the other subscriber servicing function, the method 600 proceeds to step 602 where it waits for the next subscriber access request.

In one embodiment of the invention, the subscriber 110 interacts with the personal messaging service 158 via the internet 140. Specifically, the subscriber 110 utilizes the web access device 112 to access the internet 140 via the ISP 135 and, further, to access the CSN 150 hosting the personal messaging service 158. There are several functions that may be performed by a subscriber accessing the DSN 150 in this manner. First, the subscriber may view a log of all calls that have been received. An exemplary caller log display screen is described below with respect to FIG. 7. The subscriber 110 may examine the log display screen and manipulate the data therein. Additionally, the subscriber may edit individual or group incoming call dispositions. That is, the caller may change the members of a particular calling group, change the phone number or name associated with individual callers and/or change the disposition for an incoming call from any of the callers or caller groups. An exemplary display screen enabling these administrative functions is described in more detail below with respect to FIG. 8.

FIG. 7 depicts a display screen useful in understanding the present invention. Specifically, FIG. 7 depicts a caller log display screen 700 comprising, for each of a plurality of received or incoming calls, a time/date stamp for the received call 710, the name (if available) of the caller 720, the phone number of the caller 730 and the disposition status of the received incoming call 740. As previously noted with respect to FIG. 6, the disposition option with respect to each received call may be one of accepted, rejected, forwarded or forwarded to voicemail. A control bar 750 offers several options with respect to the incoming calls displayed in the caller log information screen 700. Specifically, a first button 750 denoted as "to auto disposition" will, when selected, cause the transfer to the auto disposition screen 600 of any highlighted calls within the caller log information screen 700. A delete button 752 will, when selected, delete any highlighted calls from the caller log information screen 700. An apply button 753 will apply any changes to the caller disposition function. A closed button 754 will, when selected, close the caller log information screen 700.

Figure 8:
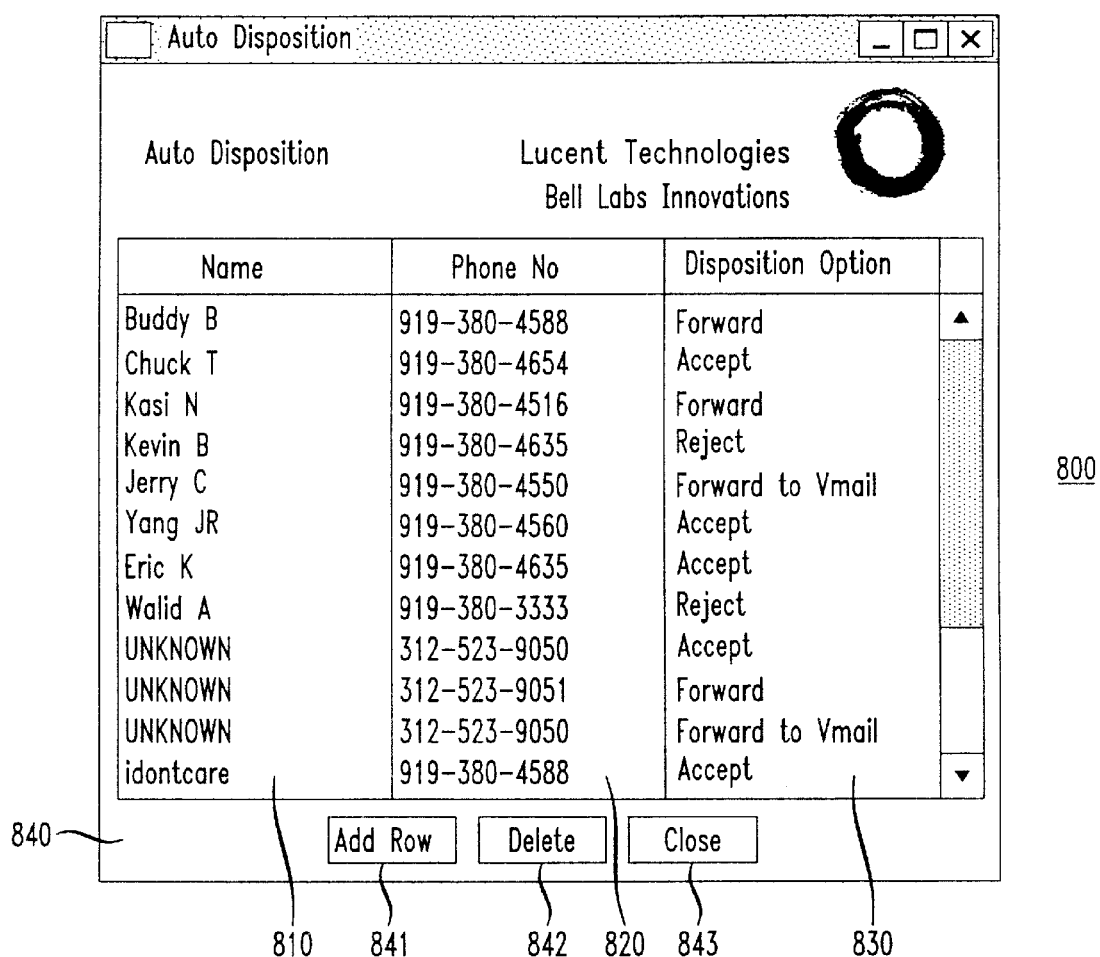

FIG. 8 depicts a display screen useful in understanding the present invention. Specifically, FIG. 8 depicts a display screen 800 which may be displayed on a subscriber's web access device 112. The display 800 comprises a tabular representation of names 810, corresponding phone numbers 820 and corresponding disposition options 830. The available disposition options are FORWARD, ACCEPT, REJECT, FORWARD TO VOICEMAIL. Each telephone number is associated with one of the disposition options. Each telephone number may also be associated with a name. The auto disposition screen 800 of FIG. 8 is accessed by a subscriber via the subscriber's web access device 112. By interacting with the customer announcement service 158 using the auto disposition screen 800, a subscriber may quickly add or delete information from the auto disposition screen, thereby quickly modifying the operations of the customer announcement service 158 with respect to the modified phone numbers within the auto disposition screen 800.

The auto disposition screen 800 also includes a control bar 840 including several user selectable buttons. An add row button 841 will, when selected, add a blank row so that a user may enter a new name, phone number or disposition option. A delete button 842 will, when selected, delete any highlighted rows from the display screen. A closed button 843 will, when selected, close the auto disposition display screen 800.

Figure 9:
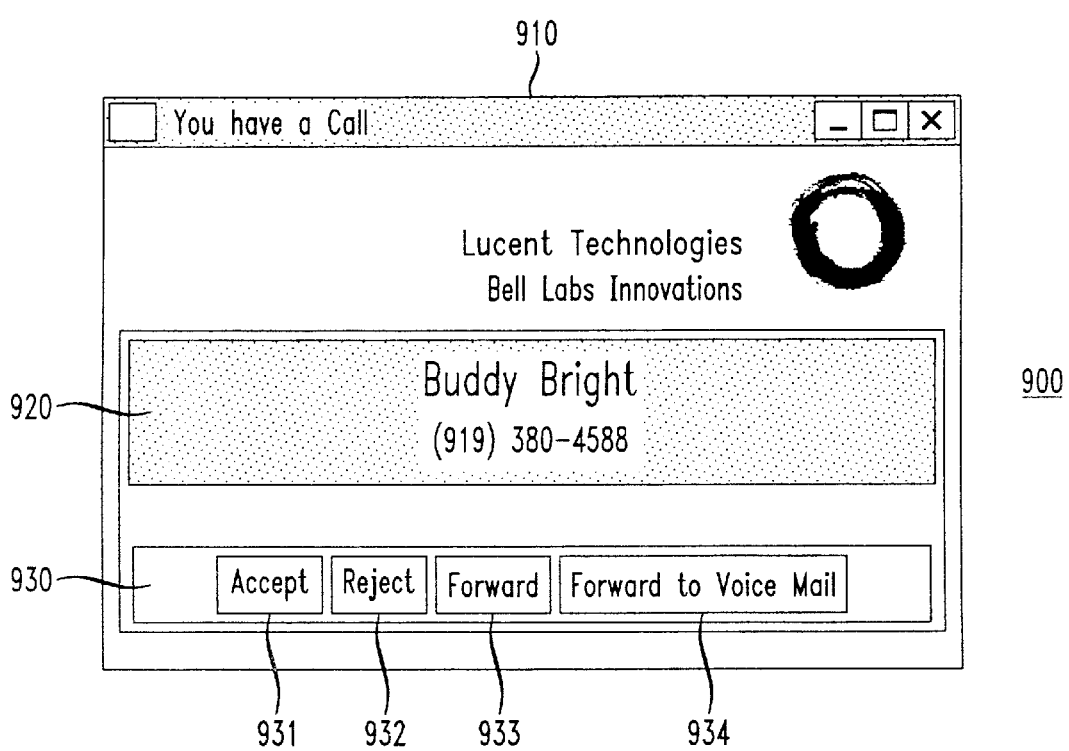

FIG. 9 depicts a display screen useful in understanding the present invention. Specifically, FIG. 9 depicts a display screen 900 which may be displayed on a subscriber's web access device 112 as a "pop up" window in the event of the subscriber receiving an incoming telephone call while the subscriber is using his only telephone line to support an internet or other computer network connection. The display 900 comprises a message bar 910 indicating that, for example, the subscriber has an incoming call, a caller identification box indicating the telephone number and, if available, the name of the incoming caller, and a control bar 930 including several user selectable buttons to indicate the appropriate disposition of the incoming call. Specifically, the subscriber accept the incoming call via an ACCEPT disposition button 931, reject the incoming call via a REJECT disposition button 932, forward the incoming call via a FORWARD disposition button 933 or forward the incoming call to a voice mailbox via a FORWARD TO VOICEMAIL disposition button 934.

The imagery associated with the display screen 900 may be stored in the subscribers web access device 112 or provided by the ISP 135. In either case, the CSN 150 receives the subscriber's incoming call, determines that the subscriber's telephone line is busy and forwards the caller identification information to the subscriber's ISP 135. The ISP 135 responsively causes the display screen 900, or a functionally similar display screen or dialog box, to appear on the display device associated with the subscribers web access device 112. In this manner, the subscriber is given the option of receiving an incoming call even when the subscriber is using a single telephone line to support a computer network connection. Moreover, the subscriber is able to utilize a full messaging system to provide individual messages or voice mail boxes to calling parties based on caller identifications.

Although various embodiments which incorporate the teachings of the present invention have been shown and described in detail herein, those skilled in the art can readily devise many other varied embodiments that still incorporate these teachings, such as hybrid SONET/ATM embodiment and other processes and apparatus for practicing those processes.

What is claimed is:

1. A method comprising the steps of:
   identifying a calling party associated with an incoming call to a subscriber; and
   determining if said calling party is a member of any caller groups defined by said subscriber, said subscriber defining membership within a calling group using the respective telephone number of each member of the calling group;
   wherein, in response to said calling party being a member of a caller group having associated with it a respective group message, playing said respective group message for said calling party and selectively routing said incoming call to said subscriber; and
   wherein, in response to said subscriber's line being busy due to an existing connection to a network service provider, communicating, to said network service provider, calling party information about said calling party such that said subscriber may be alerted to said incoming call; receiving, from said network service provider, a response from said subscriber; and routing said incoming call according to said subscriber response.

2. The method of claim 1, wherein said calling party information is communicated to said network provider via a switch associated with said network provider and said subscriber.

3. The method of claim 1, wherein said calling party information is communicated to said network provider via a direct network connection.

4. The method of claim 1, wherein, in the case of said subscriber response comprising a call reject response, performing the steps of selectively recording a voice message from said calling party and terminating said incoming call.

5. The method of claim 1, wherein, in the case of said subscriber response comprising a call accept response, performing one of the steps of:
   routing said incoming call to said subscriber's telephone when said subscriber line becomes available; and
   routing said incoming call to said subscriber's network access device.

6. The method of claim 5, wherein said incoming call is routed to said subscriber's network access using a voice over internet protocol.

7. The method of claim 1, wherein, in the case of said subscriber response comprising a call forward response, performing the step of forwarding said incoming call to a predefined telephone number.

8. The method of claim 1, wherein said calling party information about said calling party comprises a telephone number and an available name of said calling party, said subscriber being alerted via a display device associated with said subscribers network access device.

9. The method of claim 1, wherein, in response to said calling party being a member of a blocked caller group, performing the step of playing a predefined blocked group message for said calling party and, after selectively recording a voice message from said calling party, terminating said incoming call.

10. The method of claim 1, wherein, in response to a call forwarding function being enabled, performing one of the steps of:
   forwarding said incoming call to a predefined telephone number; or
   recording a voice message from said calling party, said voice message being recorded in one of a message box associated with said calling party or a general message box.

11. The method of claim 1, wherein, in response to a do not disturb function being enabled, performing the step of recording a voice message from said calling party, said voice message being recorded in one of a message box associated with said calling party and a general message box.

12. Apparatus comprising:
   a compact server node (CSN) communicating with a switch having associated with it a subscriber;
   wherein said CSN identifies a calling party associated with an incoming call to said subscriber and determines if said calling party is a member of any caller groups defined by said subscriber, said subscriber defining membership within a calling group using the respective telephone number of each member of the calling group;
   wherein in response to said calling party being a member of a caller group having associated with it a respective group message, said CSN causes said respective group message to be played to said calling party and selectively routing said incoming call to said subscriber; and
   wherein in response to said subscriber's line being busy due to an existing connection to a network service provider, said CSN communicates to said network service provider calling party information about said calling party such that said subscriber may be alerted to said incoming call; said CSN receives, from said network service provider, a response from said subscriber; and said CSN causes said incoming call to be routed according to said subscriber response.

13. The apparatus of claim 12, wherein said calling party information is communicated to said network provider via a switch associated with said network provider and said subscriber.

14. The apparatus of claim 12, wherein said calling party information is communicated to said network provider via a direct network connection.

15. The apparatus of claim 12, wherein, in the case of said subscriber response comprising a call reject response, said CSN selectively records a voice message from said calling party and terminates said incoming call.

16. The apparatus of claim 12, wherein, in the case of said subscriber response comprising a call accept response: said CSN routes said incoming call to said subscriber's telephone when said subscriber line becomes available.

17. The apparatus of claim 12, wherein, in the case of said subscriber response comprising a call accept response:
   said CSN routes said incoming call to said subscriber's network access device.

18. The apparatus of claim 17, wherein said incoming call is routed to said subscribers network access using a voice over internet protocol.

19. The apparatus of claim 12, wherein, in the case of said subscriber response comprising a call forward response, said CSN forwards said incoming call to a predefined telephone number.

20. The apparatus of claim 12 wherein said calling party information about said calling party comprises a telephone number and an available name of said calling party, said subscriber being alerted via a display device associated with said subscriber's network access device.

21. The apparatus of claim 12, wherein, in response to said calling party being a member of a blocked caller group, said CSN plays a predefined blocked group message for said calling party and, after selectively recording a voice message from said calling party, terminates said incoming call.

22. The apparatus of claim 12, wherein, in response to a call forwarding function being enabled, said CSN forwards said incoming call to a predefined telephone number.

23. The apparatus of claim 12, wherein, in response to a call forwarding function being enabled, said CSN records a voice message from said calling party, said voice message being recorded in one of a message box associated with said calling party and a general message box.

24. The apparatus of claim 12, wherein, in response to a do not disturb function being enabled, said CSN records a voice message from said calling party, said voice message being recorded in one of a message box associated with said calling party or a general message box.

25. A computer readable medium storing a software program that, when executed by a computer, causes the computer to perform a method comprising:
   identifying a calling party associated with an incoming call to a subscriber; and
   determining if said calling party is a member of any caller groups defined by said subscriber, said subscriber defining membership within a calling group using the respective telephone number of each member of the calling group;
   wherein, in response to said calling party being a member of a caller group having associated with it a respective group message, playing said respective group message for said calling party and selectively routing said incoming call to said subscriber; and
   wherein, in response to said subscriber's line being busy due to an existing connection to a network service provider, communicating, to said network service provider, calling, party information about said calling party such that said subscriber may be alerted to said incoming call, receiving, from said network service provider, a response from said subscriber; and routing said incoming call according to said subscriber response.

26. The method of claim 25, wherein said calling party information is communicated to said network service provider via a switch associated with said network provider and said subscriber.

27. The method of claim 25, wherein said calling party information is communicated to said network service provider via a direct network connection.

28. The method of claim 25, wherein, in the case of said subscriber response comprising a call reject response, performing the steps of selectively recording a voice message from said calling party and terminating said incoming call.

29. The method of claim 25, wherein, in the case of said subscriber response comprising a call accept response, performing one of the steps of:
   routing said incoming call to at least one telephone of said subscriber when said subscriber line becomes available; and
   routing said incoming call to a network access device of said subscriber.

30. The method of claim 29, wherein said incoming call is routed to said subscriber's network access device using a voice over internet protocol.

31. The method of claim 25, wherein, in the case of said subscriber response comprising a call forward response, performing the step of forwarding said incoming call to a predefined telephone number.

32. The method of claim 25, wherein said calling party information about said calling party comprises a telephone number and an available name of said calling party, said subscriber being alerted via a display device associated with said subscribers network access device.

33. The method of claim 25, wherein, in response to said calling party being a member of a blocked caller group, performing the step of playing a predefined blocked group message for said calling party and, after selectively recording a voice message from said calling party, terminating said incoming call.

* * * * *